US010818955B2

(12) United States Patent
Uchiyama et al.

(10) Patent No.: US 10,818,955 B2
(45) Date of Patent: Oct. 27, 2020

(54) FUEL CELL UNIT AND FUEL CELL VEHICLE

(71) Applicant: Toyota Jidosha Kabushiki Kaisha, Toyota-shi Aichi-ken (JP)

(72) Inventors: Tomoaki Uchiyama, Sunto-gun Shizuoka-ken (JP); Masayuki Ito, Sunto-gun Shizuoka-ken (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 125 days.

(21) Appl. No.: 16/178,953

(22) Filed: Nov. 2, 2018

(65) Prior Publication Data

US 2019/0198907 A1 Jun. 27, 2019

(30) Foreign Application Priority Data

Dec. 25, 2017 (JP) ................................ 2017-248136

(51) Int. Cl.

*H01M 8/2465* (2016.01)
*H01M 8/2475* (2016.01)
*H01M 8/247* (2016.01)
*H01M 8/0271* (2016.01)
*H01M 8/241* (2016.01)
*H01M 8/1018* (2016.01)

(52) U.S. Cl.

CPC ....... *H01M 8/2465* (2013.01); *H01M 8/0271* (2013.01); *H01M 8/241* (2013.01); *H01M 8/247* (2013.01); *H01M 8/2475* (2013.01); *H01M 2008/1095* (2013.01); *H01M 2250/20* (2013.01)

(58) Field of Classification Search

CPC .. H01M 8/2465; H01M 8/0271; H01M 8/241; H01M 8/247; H01M 8/2475
USPC ........................................................ 429/452
See application file for complete search history.

(56) References Cited

U.S. PATENT DOCUMENTS 6,479,180 B1 11/2002 Uozumi
2014/0367182 A1* 12/2014 Yoshinaga .......... H01M 8/2475 180/68.4
2016/0049681 A1 2/2016 Takeyama
2017/0365872 A1* 12/2017 Takabatake ......... H01M 8/0232

FOREIGN PATENT DOCUMENTS

JP 2001-030771 A 2/2001
JP 2003-203670 A 7/2003
JP 2005-071869 A 3/2005
JP 2007015591 A * 1/2007
JP 2014-154325 A 8/2014
JP 2017-199709 A 11/2017

* cited by examiner

*Primary Examiner* — Sean P Cullen
(74) *Attorney, Agent, or Firm* — Dinsmore & Shohl LLP

(57) ABSTRACT

A fuel cell unit includes: a fuel cell module including a fuel cell stack including: a stacked body in which unit cells are stacked; a pair of end plates sandwiching the stacked body in a stacking direction; a facing member facing an outer surface of the stacked body extending along the stacking direction; and first and second restriction members arranged between the facing member and the stacked body, and restricting a position of the stacked body in a direction perpendicular to the stacking direction by contacting with the outer surface; and fixing members fixing the fuel cell module to a fixed member.

12 Claims, 8 Drawing Sheets

FUEL CELL UNIT AND FUEL CELL VEHICLE

CROSS-REFERENCE TO RELATED APPLICATION

This application is based upon and claims the benefit of priority of the prior Japanese Patent Application No. 2017-248136, filed on Dec. 25, 2017, the entire contents of which are incorporated herein by reference.

TECHNICAL FIELD

The present disclosure relates to a fuel cell unit and a fuel cell vehicle.

BACKGROUND

There is known a fuel cell stack equipped with a stacked body in which unit cells are stacked. Such a stacked body is sandwiched by a pair of end plates in a stacking direction at predetermined pressure, which suppresses positional displacement of the unit cells in a direction perpendicular to the stacking direction. However, for example, when a vehicle equipped with the fuel cell stack collides, a large inertial force might exert on the fuel cell stack, which might positionally displace the unit cells. For example, in Japanese Unexamined Patent Application Publication No. 2005-071869, a mechanism for adjusting a gap between the stacked body and a case housing the stacked body is provided to suppress the positional displacement of the unit cells.

In some cases, a fuel cell module including such a stacked body is fixed to a fixed member at a position distant from the center of gravity of the module. A mechanism for effectively suppressing the positional displacement of the unit cells even in such a case is not disclosed in Japanese Unexamined Patent Application Publication No. 2005-071869.

SUMMARY

It is an object of the present disclosure to provide a fuel cell unit and a fuel cell vehicle having the same effectively suppressing positional displacement of unit cells in a case where a fuel cell module including a stacked body in which the unit cells are stacked is fixed to a fixed member at a position distant from a center of gravity of the fuel cell module.

The above object is achieved by a fuel cell unit including: a fuel cell module including a fuel cell stack including: a stacked body in which unit cells are stacked; a pair of end plates sandwiching the stacked body in a stacking direction; a facing member facing an outer surface of the stacked body extending along the stacking direction; and first and second restriction members arranged between the facing member and the stacked body, and restricting a position of the stacked body in a direction perpendicular to the stacking direction by contacting with the outer surface; and fixing members fixing the fuel cell module to a fixed member, wherein the stacking direction includes a first side and a second side opposite to the first side, a center of gravity of the fuel cell module is positioned in the first side of the stacking direction from a region surrounded by the fixing members, the first restriction member restricts a first part of the stacked body positioned in the first side of the stacking direction from a center of the stacked body, the second restriction member restricts a second part of the stacked body positioned in the second side of the stacking direction from the center of the stacked body, and the first and second restriction members are provided such that restriction force restricting the first part of the stacked body is greater than restriction force restricting the second part of the stacked body.

Since the center of gravity of the fuel cell module is positioned in the first side in the stacking direction from the region between the fixing members, an inertial force exerts on the stacked body to rotate about the region between the fixing members, when an inertial force exerts on the fuel cell module. For this reason, an inertial force exerting on the first part of the stacked body from the center of the stacked body is greater than an inertial force exerting on the second part of the stacked body. However, the restriction force restricting the first part of the stack is greater than restriction force restricting the second part of the stack. It is thus possible to effectively suppress the positional displacement of the unit cells.

The first restriction member may be positioned at one end of the stacked body positioned in the first side of the stacking direction from the center of the stack, and the second restriction member may be positioned at another end of the stacked body positioned in the second side of the stacking direction from the center of the stack.

A size of the first restriction member may be greater than that of the second restriction member.

Hardness of the first restriction member may be greater than that of the second restriction member.

At least the first restriction member may include first restriction members, and the number of the first restriction members may be larger than that of the second restriction member.

The fuel cell module may include an auxiliary device integrally provided in the fuel cell stack.

The above object is also achieved by a fuel cell vehicle including: a vehicle body constitution member; and a fuel cell unit, wherein the fuel cell unit includes: a fuel cell module including: a fuel cell stack including: a stacked body in which unit cells are stacked; a pair of end plates sandwiching the stacked body in a stacking direction; a facing member facing an outer surface of the stacked body extending along the stacking direction; and first and second restriction members arranged between the facing member and the stacked body, and restricting a position of the stacked body in a direction perpendicular to the stacking direction by contacting with the outer surface and fixing members fixing the fuel cell module to a fixed member, the stacking direction includes a first side and a second side opposite to the first side, a center of gravity of the fuel cell module is positioned in the first side of the stacking direction from a region surrounded by the fixing members, the first restriction member restricts a first part of the stacked body positioned in the first side of the stacking direction from a center of the stacked body, the second restriction member restricts a second part of the stacked body positioned in the second side of the stacking direction from the center of the stacked body, the first and second restriction members are provided such that restriction force restricting the first part of the stacked body is greater than restriction force restricting the second part of the stacked body, and the fixed member is the vehicle body constitution member.

DETAILED DESCRIPTION

Figure 1A:
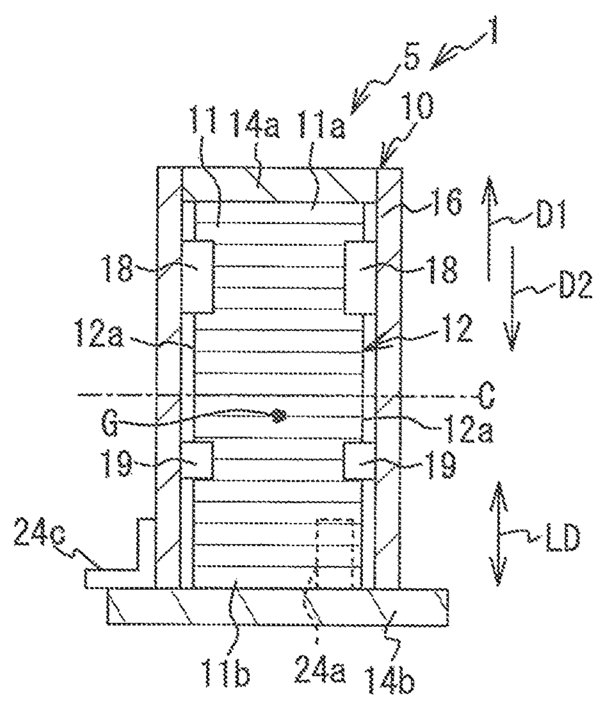
FIG. 1A is a cross-sectional view when viewed from a lateral side illustrating an internal configuration of a fuel cell unit according to the present embodiment.
Figure 1B:
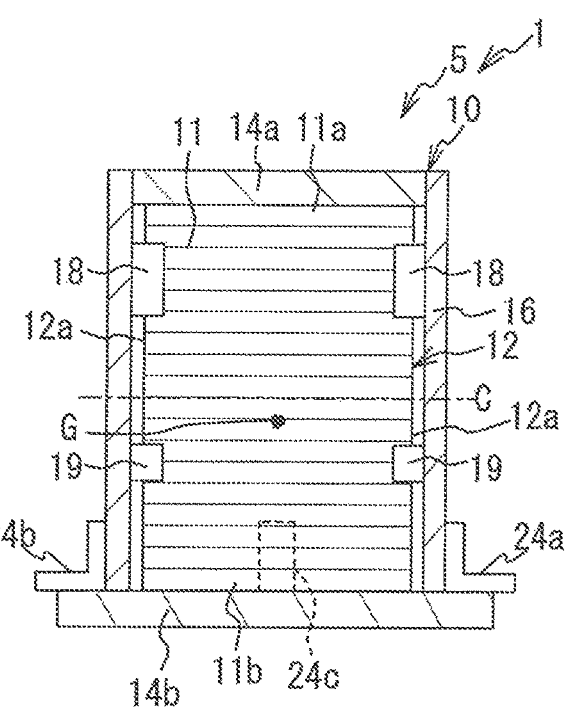
FIG. 1B is a cross-sectional view when viewed from a front side illustrating an internal configuration of a fuel cell unit according to the present embodiment.
Figure 1C:
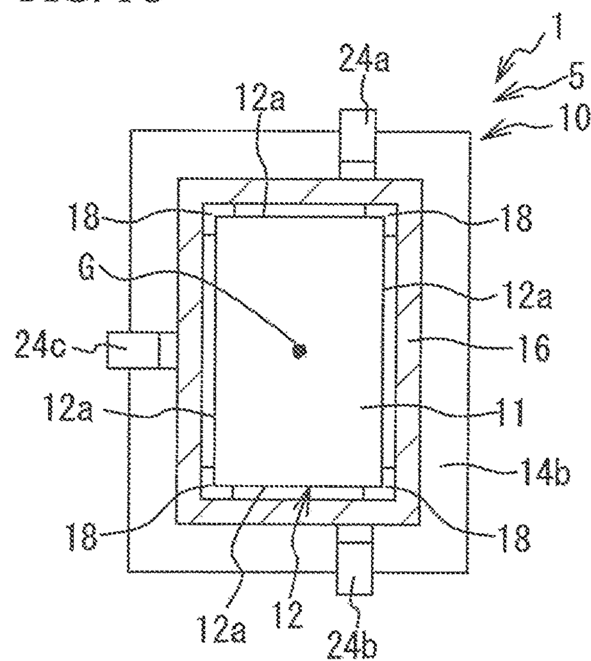
FIG. 1C is a cross-sectional view when viewed from an upper side illustrating an internal configuration of a fuel cell unit according to the present embodiment.

FIGS. 1A to 1C are cross-sectional views illustrating an internal configuration of a fuel cell unit 1 according to the present embodiment. FIG. 1A is a cross-sectional view of the fuel cell unit (hereinafter, simply referred to as a unit) 1 when viewed from a lateral side. FIG. 1B is a cross-sectional view of the unit 1 when viewed from a front side. FIG. 1C is a cross-sectional view of the unit 1 when viewed from an upper side. The unit 1 includes a fuel cell module (hereinafter simply referred to as a module) 5 and brackets 24*a* to 24*c*. The module 5 includes a fuel cell stack (hereinafter simply referred to as a stack) 10. The stack 10 includes a stacked body 12, end plates 14*a* and 14*b*, a case 16, and restriction members 18 and 19. The brackets 24*a* to 24*c* are metal members. The brackets 24*a* to 24*c* are examples of fixing members fixing the module 5 to the fixed member. For example, in a case of fixing the module 5 to a vehicle, the fixed member is a member constituting a vehicle body. In a case where the module 5 is a stationary type for home use or business use, the fixed member is an installation base or the like. In the present embodiment, the brackets 24*a* to 24*c* fix the end plate 14*b* of the stack 10 to the fixed member.

The stacked body 12 is formed by stacking unit cells 11. Each of the unit cells 11 has a substantially rectangular shape. The stacked body 12 has a substantially prismatic shape. In the present embodiment, an exemplary description will be given of the stack 10 fixed in a posture in which the stacking direction of the stacked body 12 substantially the same as the gravity direction. A unit cell 11*a* among the unit cells 11 is positioned at one end thereof. A unit cell 11*b* among the unit cells 11 is positioned at the other end thereof. The unit cell 11*a* is positioned from the unit cell 11*b* in an upper side D1 of the stacking direction LD, that is, the unit cell 11*a* is positioned above the unit cell 11*b* in the gravity direction.

The unit cell 11 is a polymer electrolyte fuel cell that generates electric power by being supplied with a fuel gas (for example, hydrogen) and an oxidant gas (for example, air) as reaction gases. The unit cell 11 includes a pair of separators and a MEGA (Membrane Electrode Gas diffusion layer Assembly). The pair of separators is made of a member having gas barrier property and electronic conductivity, and forms a fuel gas flow path through which the fuel gas supplied to the MEGA flows and an oxidizing gas flow path through which the oxidant gas supplied to the MEGA flows.

The MEGA includes a membrane electrode assembly (MEA: Membrane Electrode Assembly) including an electrolyte membrane and a pair of catalyst layers arranged on respective both sides of the electrolyte membrane. The electrolyte membrane is a solid polymer membrane made of a fluorine resin material having a sulfonic acid group or a carbon resin material, and has high proton conductivity in a wet state. The pair of catalyst layer is a solid polymer that includes: a carbon particle carrying a catalyst for accelerating an electrochemical reaction; and an ionomer being a solid polymer with a sulfonic acid group, and having high proton conductivity in a wet state. Gas diffusion layers are arranged on respective both sides of the MEA. The MEGA is configured by the MEA and the pair of gas diffusion layers. The pair of gas diffusion layers is made of a member having gas permeability and electronic conductivity.

The end plates 14*a* and 14*b* sandwich the stacked body 12 in the stacking direction LD and restricts the unit cells 11 in the stacking direction LD, which maintains high gas sealing property, electronic conductivity, and the like. The end plate 14*a* is positioned in the upper side D1 of the stacking direction LD from the end plate 14*b*. Although the end plates 14*a* and 14*b* have the same thickness, the end plate 14*b* is formed larger than the end plate 14*a*. Each of the end plates 14*a* and 14*b* is made of, for example, a metal.

Three brackets 24*a* to 24*c* are fixed to the end plate 14*b*, and the brackets 24*a* to 24*c* are fixed to another member, so that the stack 10 is fixed to another member. Herein, the center of gravity G of the module 5 illustrated in FIGS. 1A to 1C is positioned in the upper side D1 from the region among the brackets 24*a* to 24*c*. Since the module 5 includes only the stack 10 in the present embodiment, the center of gravity G of the module 5 means the center of gravity of the stack 10. The positional relationship between the center of gravity G and the region among the brackets 24*a* to 24*c* will be described later. The brackets 24*a* and 24*b* are positioned to sandwich the stack 10 from both sides. The bracket 24*c* is positioned on the rear side of the stack 10. Additionally, among the end plates 14*a* and 14*b* and the stacked body 12, there is provided with terminal plates that sandwich the stacked body 12 and extract generated electric power from the unit cells 11, and insulators that sandwich the stacked body 12 and the pair of terminal plates and insulate the unit cells 11 from the end plates 14*a* and 14*b*.

The case 16 is formed into a square tubular shape so as to surround an outer surface 12*a* extending along the stacking direction LD of the stacked body 12. An opening end of the case 16 positioned in the upper side D1 of the stacking direction LD is closed with the end plate 14*a*. An opening end of the case 16 positioned in the lower side D2 of the stacking direction LD is closed with the end plate 14*b*. The case 16 is made of a metal such as stainless steel or aluminum alloy. The case 16 is an example of a facing member facing the outer surface 12*a* of the stacked body 12 extending along the stacking direction.

The restriction members 18 and 19 are provided between the outer surface 12*a* of the stacked body 12 and the case 16, and restrict positional displacement of the stacked body 12 in a direction perpendicular to the stacking direction LD by contacting with the outer surface 12*a* of the stacked body 12. This suppresses the positional displacement of the unit cells 11 in the direction perpendicular to the stacking direction LD as will be described later. The restriction member 18 is arranged in the upper side D1 of the stacking direction LD above a center line C that is obtained by equally dividing the stacked body 12 in the stacking direction LD. The restriction member 19 is arranged in the lower side D2 of the stacking direction LD below the center line C. The center of gravity G is positioned slightly below the center line C in the lower side D2 of the gravity direction. The reason for this is that the end plate 14*b* is larger and heavier than the end plate 14*a* as described above.

Figure 2A:
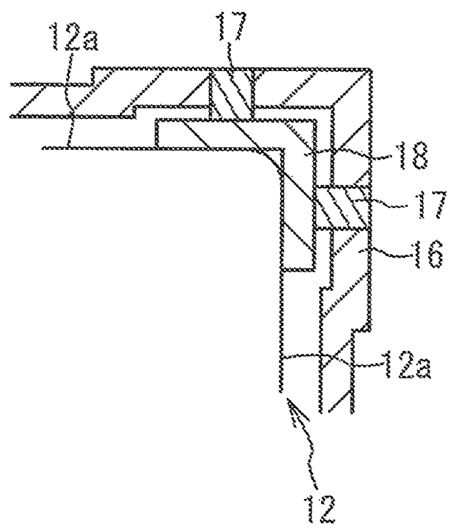
FIG. 2A is a cross-sectional view illustrating a periphery of a corner part of a stacked body in a region where a restriction member is provided.
Figure 2B:
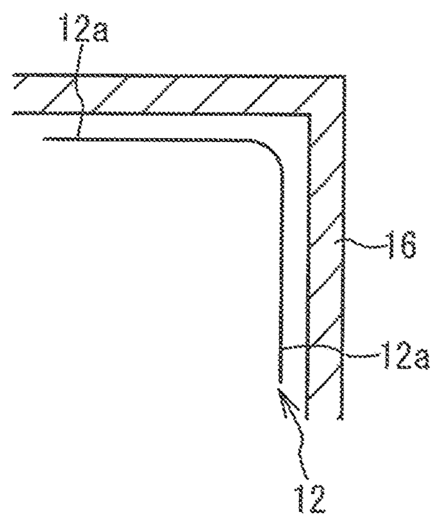
FIG. 2B is a cross-sectional view illustrating a periphery of a corner part of the stacked body in a region where the restriction member is not provided.

FIGS. 2A and 2B are cross-sectional views illustrating the periphery of a corner part of the stacked body 12. FIG. 2A is a cross-sectional view of the corner part of the stacked body 12 in a region where the restriction member 18 is provided. FIG. 2B is a cross-sectional view in a region where the restriction member 18 is not provided. As illustrated in FIG. 2A, the restriction member 18 is substantially L-shaped and is provided at four corner parts of the outer surface 12*a* of the stacked body 12. The same applies to the restriction member 19.

As illustrated in FIGS. 2A and 2B, a portion of the case 16 into which the restriction member 18 is assembled protrudes outside, as compared with the other portion. This ensures a space in which the restriction member 18 is provided between the outer surface 12*a* of the stacked body 12 and the case 16. The restriction member 18 is pressed against the outer surface 12*a* of the stacked body 12 by fastening members 17 such as screws provided in the case 16.

Figure 2C:
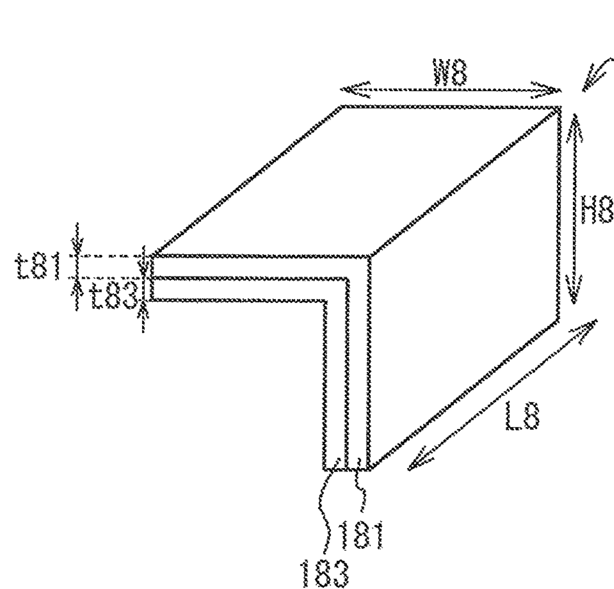
FIG. 2C is a perspective view of the restriction member.

FIG. 2C is a perspective view of the restriction member 18. The restriction member 18 includes a metal portion 181 and an elastic portion 183. The metal portion 181 is made of a metal such as stainless steel or the like. The elastic portion 183 is made of, but not limited to, a synthetic resin such as polypropylene, and may be made of a rubber or a material that has elasticity ensured by adding an elastomer component into the synthetic resin. The metal portion 181 is provided so as to cover the outer side of the elastic portion 183. Therefore, the elastic portion 183 contacts with the outer surface 12*a* of the stacked body 12. Each of a thickness t81 of the metal portion 181 and a thickness t83 of the elastic portion 183 is, for example, 3 mm. Each of a width W8 and a height H8 of the restriction member 18 is, for example, 30 mm. A length L8 is, for example, 60 mm. Although the restriction member 18 may be formed of only one of the metal portion 181 and the elastic portion 183, the restriction member 18 including the elastic portion 183 can absorb the positional displacement due to the deformation of the case 16, thereby suppressing the influence on the stacked body 12.

Figure 2D:
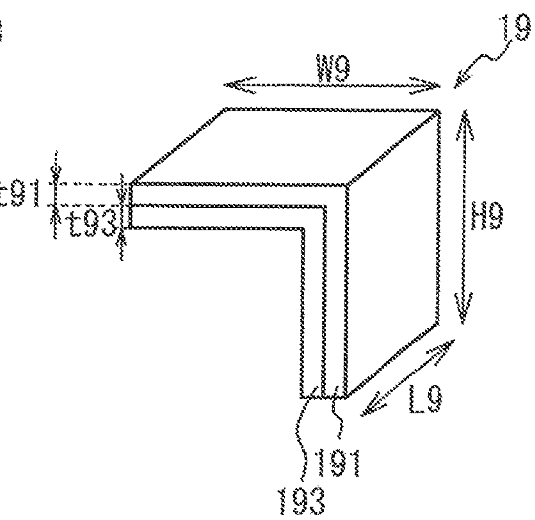
FIG. 2D is a perspective view of another restriction member.

FIG. 2D is a perspective view of the restriction member 19. Like the restriction member 18, the restriction member 19 includes a metal portion 191 and an elastic portion 193. Each of a thickness t91 of the metal portion 191 and a thickness t93 of the elastic portion 193 is, for example, 3 mm. Each of a width W9, a height H9, and a length L9 of the restriction member 19 is, for example, 30 mm. The restriction member 19 may be formed of only one of the metal portion 191 and the elastic portion 193. As described above, the restriction member 18 is formed longer than the restriction member 19, and the restriction members 18 and 19 are arranged such that each length direction thereof is the same as the stacking direction LD of the stacked body 12 as illustrated in FIGS. 1A and 1B. Since the restriction member 18 is formed longer than the restriction member 19, the restriction member 18 has a contact area with the stacked body 12 greater than that of the restriction member 19. As a result, the restriction force of the restriction member 18 is greater than that of the restriction member 19.

Figure 3A:
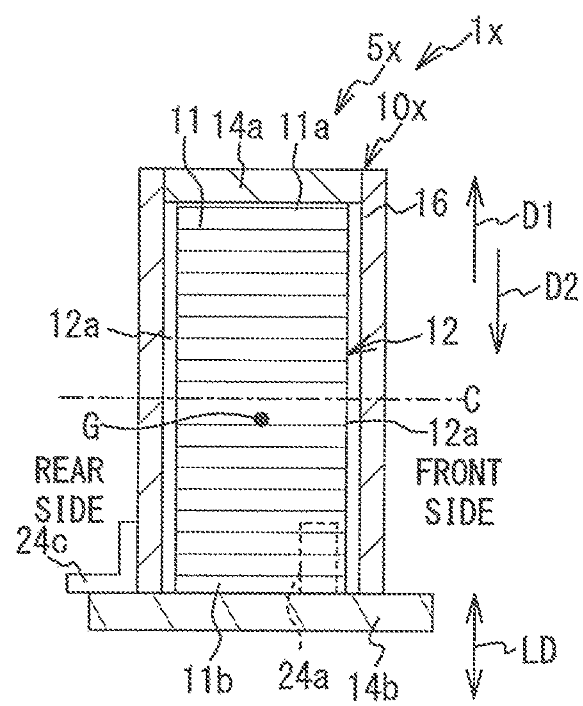
FIG. 3A is an explanatory view of a unit according to the first comparative example.

Next, a comparative example will be described. As for the comparative example, the same reference numerals are given to the same components as those according to the present embodiment, and duplicated explanation is omitted. FIG. 3A is an explanatory view of a unit 1*x* according to the first comparative example. FIG. 3A corresponds to FIG. 1A. In a stack 10*x* of a module 5*x* of the unit 1*x* as illustrated in FIG. 3A, the restriction members 18 and 19 are not provided between the outer surface 12*a* of the stacked body 12 and the case 16.

Figure 3B:
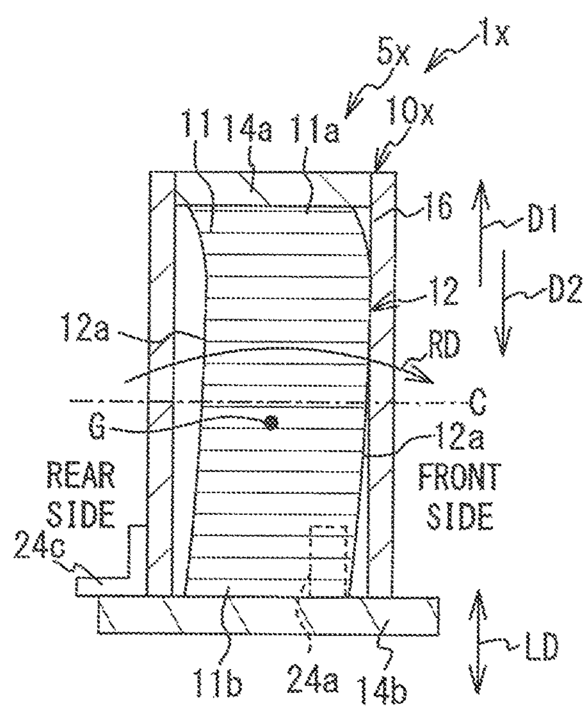
FIG. 3B is an explanatory view of a case where an inertial force exerts on a stack in the first comparative example.

FIG. 3B is an explanatory view of a case where an inertial force exerts on the stack 10*x* in the first comparative example. For example, when a vehicle equipped with the unit 1*x* suddenly accelerates, decelerates, or collides, or when the unit 1*x* is set outside and an earthquake occurs, an inertial force exerts on the stack 10*x*. For example, as illustrated in FIG. 3B, it is assumed that an inertial force exerts on the module 5*x* from the front side to the rear side thereof in the horizontal direction. Since the module 5*x*, that is, the stack 10*x* is fixed to the fixed member by the brackets 24*a* to 24*c* in this case, the inertial force exerts on the stack 10*x* to rotate about the region among the brackets 24*a* to 24*c* in a rotational direction RD. Thus, as for the positional displacement of the unit cell 11 from its original position, the positional displacement amount of the unit cell 11 positioned in the upper side D1 above the center line C that is obtained by equally dividing the stacked body 12 in the stacking direction LD is larger than that of the unit cell 11 positioned in the lower side D2 below the center line C.

Figure 3C:
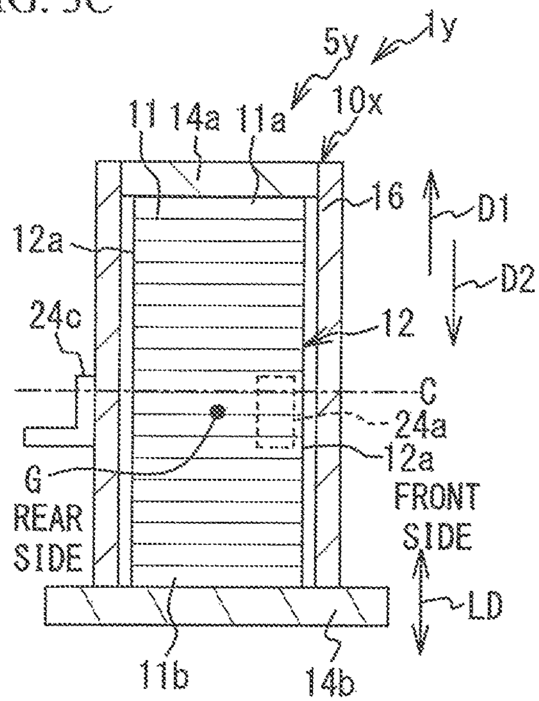
FIG. 3C is an explanatory view of a unit according to the second comparative example.
Figure 3D:
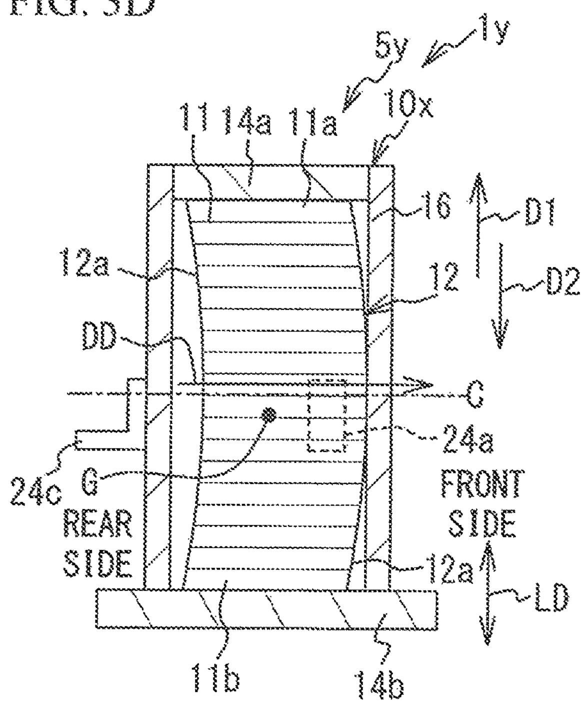
FIG. 3D is an explanatory view of a case where an inertial force exerts on a stack in the second comparative example.

FIG. 3C is an explanatory view of a unit 1*y* according to the second comparative example. FIG. 3C corresponds to FIG. 1A. In the stack 10*x* of a module 5*y* of the unit 1*y*, the brackets 24*a* to 24*c* are fixed to the stack 10*x* so as to position a center of gravity G among the brackets 24*a* to 24*c*. FIG. 3D is an explanatory view of a case where an inertial force exerts on the stack 10*x* in the second comparative example. Since the center of gravity G is positioned among the brackets 24*a* to 24*c*, the inertial force exerts on the stack 10*x* in a linear direction DD, unlike the first comparative example. Therefore, in the second comparative example, the unit cells 11 are positionally displaced such that the stacked body 12 bends substantially symmetrically with respect to the center line C. Therefore, in the second comparative example, the difference in displacement amount between the unit cell 11 above the center line C and the unit cell 11 below the center C is small, as compared with the first comparative example.

As described above, in the case where the center of gravity G is positioned outside the region among the brackets 24*a* to 24*c* in the first comparative example, the inertial force exerts on the stack 10*x* to rotate about the region among the brackets 24*a* to 24*c*. Therefore, in the first comparative example, the positional displacement amount of the unit cell 11 positioned in the upper side D1 above the center line C is larger than that of the unit cell 11 positioned in the lower side D2 below the center line C as described above. In the present embodiment, considering that the inertial force exerts on the stack 10 to rotate in such a way, the comparatively large restriction member 18 is arranged in the upper side D1 above the center line C where the positional displacement amount of the unit cell 11 is relatively large, and a relatively small restriction member 19 is arranged in the lower side D2 below the center line C where the positional displacement amount of the unit cell 11 is relatively small. This ensures the restriction force in the upper side D1 above the center line C of the stacked body 12 that is greater than that in the lower side D2 below the center line C of the stacked body 12. It is therefore possible to effectively suppress the positional displacement of the unit cells 11 by a few restriction members. This suppresses an increase in the number of parts, and suppresses an increase in manufacturing cost of the stack 10. Further, as illustrated in FIG. 3B, the unit cell 11 having the largest amount of the positional displacement is positioned between the center line C and the unit cell 11*a*. In the present embodiment, the restriction member 18 is arranged to restrict at least the unit cell 11 having the largest amount of the positional displacement. Accordingly, it is possible to effectively suppress the positional displacement of the unit cells 11. In addition, the restriction member 19 is positioned between the center line C and the unit cell 11*b*.

Figure 4A:
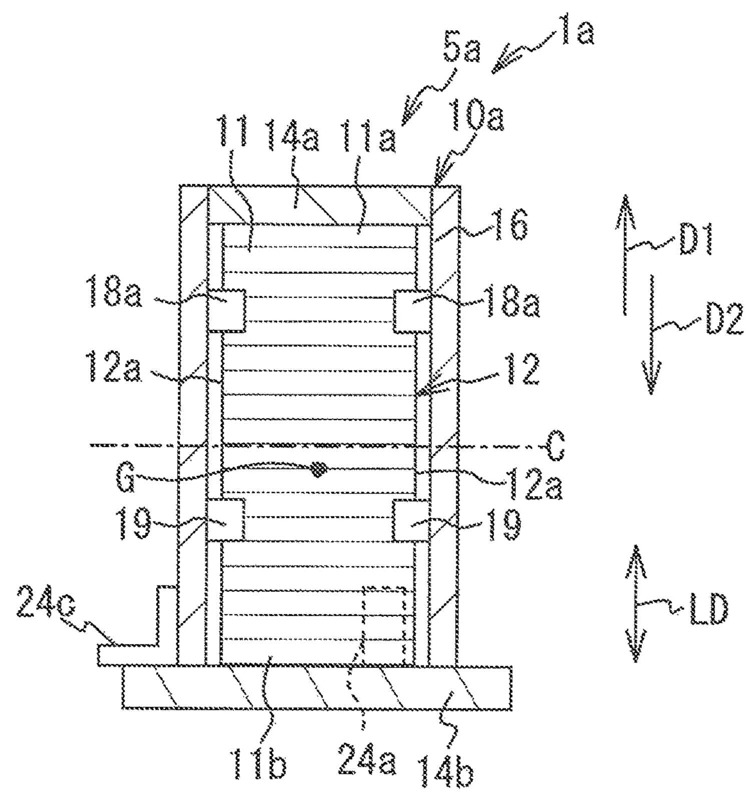
FIG. 4A is a cross-sectional view of a unit according to the first variation when viewed from a lateral side.

Next, variations will be described. As for the variations, the same reference numerals are given to the same components as those of the above-described embodiment, and duplicated explanation is omitted. FIG. 4A is a cross-sectional view of a unit 1*a* according to the first variation when viewed from the lateral side. FIG. 4A corresponds to FIG. 1A. In a stack 10*a* of a module 5*a* of the unit 1*a*, restriction members 18*a* are arranged instead of the restriction members 18 described above. The restriction member 18*a* has substantially the same size as the restriction member 19, but has higher hardness (for example, higher Vickers hardness) than that of the restriction member 19. For example, the elastic portion of the restriction member 18*a* is made of a synthetic resin material having a higher hardness than that of the elastic portion 193 of the restriction member 19. A Young's modulus of the restriction member 18*a* having a higher hardness is greater than that of the restriction member 19, so that the restriction force of the restriction member 18*a* is greater than that of the restriction member 19. It is therefore possible to effectively suppress the positional displacement of the unit cells 11. In addition, in a case where each of the elastic portion of the restriction member 18*a* and the elastic portion 193 of the restriction member 19 is made of a rubber, the elastic portion of the restriction member 18*a* may be made of a material having a Young's modulus greater than that of the elastic portion 193. The restriction member 18*a* may be made of a metal and the restriction member 19 may be made of a synthetic resin.

Figure 4B:
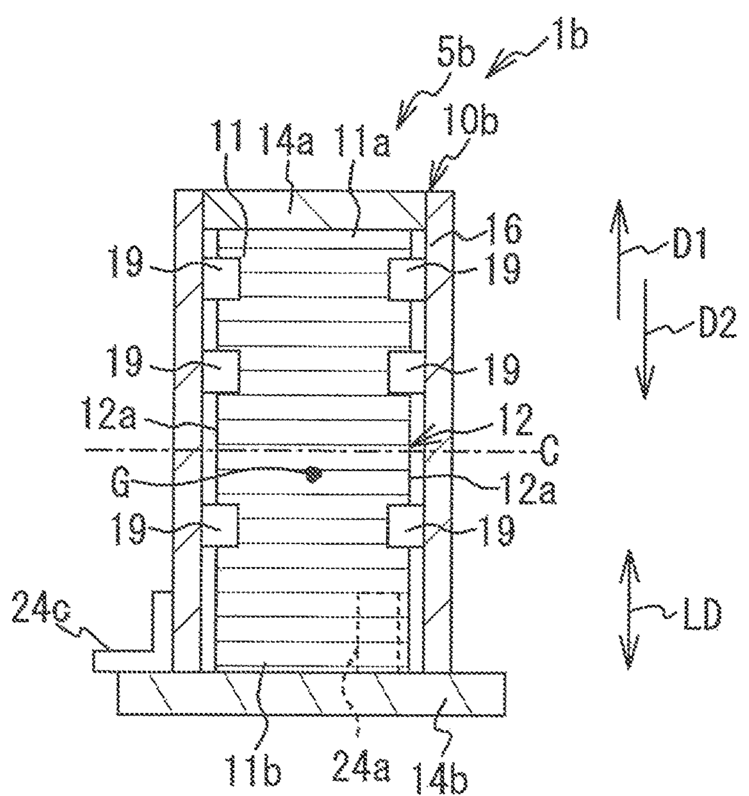
FIG. 4B is a cross-sectional view of a unit according to the second variation when viewed from a lateral side.

FIG. 4B is a cross-sectional view of a unit 1*b* according to the second variation when viewed from the lateral side. FIG. 4B corresponds to FIG. 1A. In a stack 10*b* of a module 5*b* of the unit 1*b*, the above-described restriction members 18 are not arranged, the same restriction members 19 are arranged, and the number of the restriction members 19 is larger than the number of the restriction members provided in each of the stacks 10 and 10*a*. Specifically, the number of the restriction members 19 arranged in the upper side D1 above the center line C is larger than that of the restriction members 19 arranged in the lower side D2 below the center line C. In the upper side D1 above the center line C, the two restriction members 19 for holding the corner part of the stacked body 12 are arranged separately from each other in the stacking direction LD. Likewise, the two restriction members 19 are arranged in the other corner part. Therefore, in the second variation, eight restriction members 19 are arranged in the upper side D1 above the center line C. Therefore, the restriction force of the eight restriction members 19 arranged in the upper side D1 above the center line C is greater than that of the four restriction members 19 arranged in the lower side D2 below the center line C. Accordingly, the positional displacement of the unit cells 11 can be effectively suppressed.

Figure 5B:
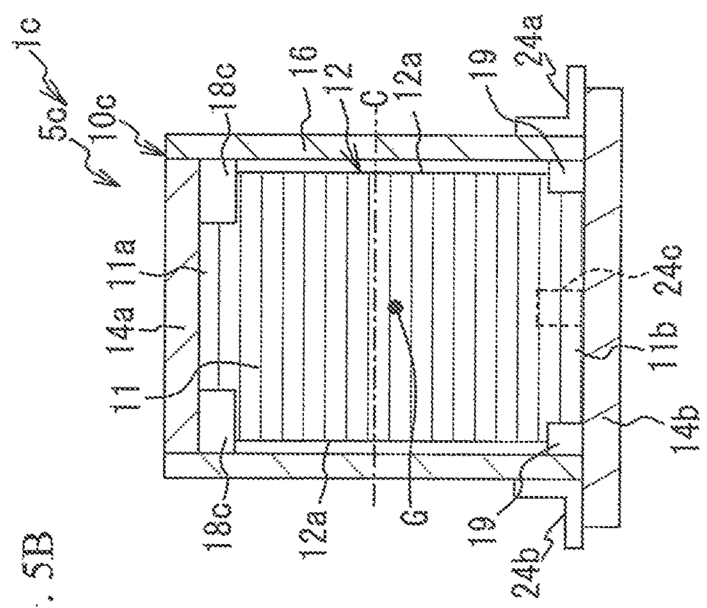
FIG. 5B is a cross-sectional view of the unit according to the third variation when viewed from a front side.
Figure 5A:
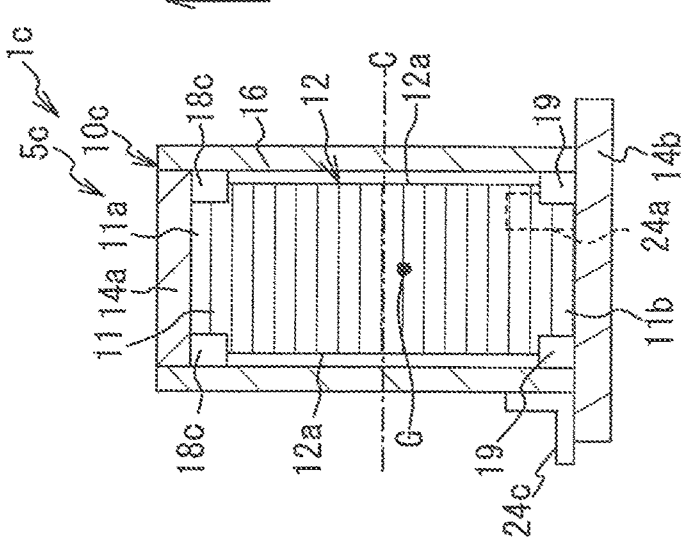
FIG. 5A is a cross-sectional view of a unit according to the third variation when viewed from a lateral side.
Figure 5C:
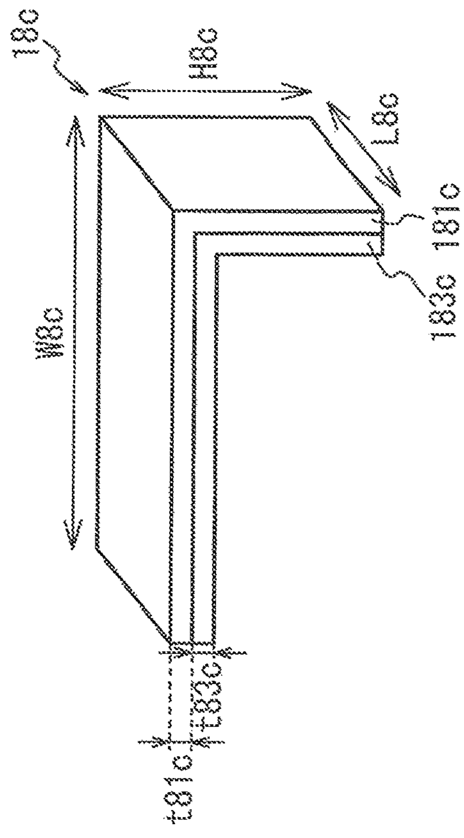
FIG. 5C is a perspective view of a restriction member.

FIG. 5A is a cross-sectional view of a unit 1*c* according to the third variation when viewed from the lateral side, FIG. 5B is a cross-sectional view of the unit 1*c* according to the third variation when viewed from the front side. FIGS. 5A and 5B correspond to FIGS. 1A and 1B, respectively. In a stack 10*c* of a module 5*c* of the unit 1*c*, restriction members 18*c* are arranged between the uppermost side or the outer surface 12*a* of the stacked body 12 and the case 16, and the restriction members 19 are arranged between the lowest side of the outer surface 12*a* of the stacked body 12 and the case 16. FIG. 5C is a perspective view of the restriction member 18*c*. Like the restriction member 18, the restriction member 18*c* includes a metal portion 181*c* and an elastic portion 183*c*. Each of a thickness t81*c* of the metal portion 181*c* and a thickness t83*c* of the elastic portion 183*c* is, for example, 3 mm. Each of a height H8*c* and a length L8*c* of the restriction member 18*c* is, for example, 30 mm. A width W8*c* of the restriction member 18*c* is, for example, 60 mm. In this way, the restriction member 18*c* is formed wider than the restriction member 18. In the third comparative example, the portion widely formed in the restriction member 18*c* is positioned on the front side of the stacked body 12.

Herein, as illustrated in FIG. 3B, among the unit cells 11 positioned in the upper side D1 above the center line C, the unit cells each having the largest difference in positional displacement amount between the two adjacent unit cells 11 are the unit cell 11*a* and the other unit cell 11 adjacent thereto. This is because, when, the inertial force exerts on the stacked body 12 to rotate about the region among the brackets 24*a* to 24*c*, a large rotational moment exerts on, among the unit cells 11, the unit cell 11*a* positioned in the end of the stacked body 12 closer to the center of gravity G of the module 5*x* than the region surrounded by the brackets 24*a* to 24*c*, and exerts on the other unit cell 11 adjacent to the unit cell 11*a*. Accordingly, the restriction member 18*c* restricts at least the positions of the unit cell 11*a* and the unit cell 11 adjacent thereto, thereby effectively suppressing the positional displacement of the unit cell 11*a* and the other unit cells 11 arranged therenear.

Further, as illustrated in FIG. 3B, among the unit cells 11 positioned in the lower side D2 below the center line C, the unit cells each having the largest difference in positional displacement amount between the two adjacent unit cells 11 are the unit cell 11*b* and the other unit cell 11 adjacent thereto. Accordingly, the restriction member 19 restricts at least the positions of the unit cell 11*b* and the unit cell 11 adjacent thereto, thereby effectively suppressing the positional displacement of the unit cell 11*b* and the other unit cells 11 arranged therenear. In such a way, by suppressing the positional displacement of the unit cells 11*a* and 11*b* and the unit cells 11 arranged therenear, it is possible to effectively suppress the positional displacement of the unit cells 11 arranged between the unit cells 11*a* and 11*b*.

Additionally, among the unit cells 11, the unit cell 11*a* is arranged at the end of the stacked body 12 closer to the center of gravity G of the module 5 than the region surrounded by the brackets 24*a* to 24*c*, and the unit cell 11*b* is arranged at the other end. The difference in positional displacement amount between the unit cell 11*a* and the other unit cell 11 adjacent thereto is larger than that in positional displacement amount between the unit cell 11*b* and the other unit cell 11 adjacent thereto. This is because the unit cell 11*a* and the other unit cell 11 adjacent thereto receive the large rotational moment as described above. Therefore, the restriction member 18*c* is formed larger than the restriction member 19, ensuring the restriction force of the restriction member 18*c* larger than that of the restriction member 19. This can effectively suppress the positional displacement of the unit cells 11.

Figure 6B:
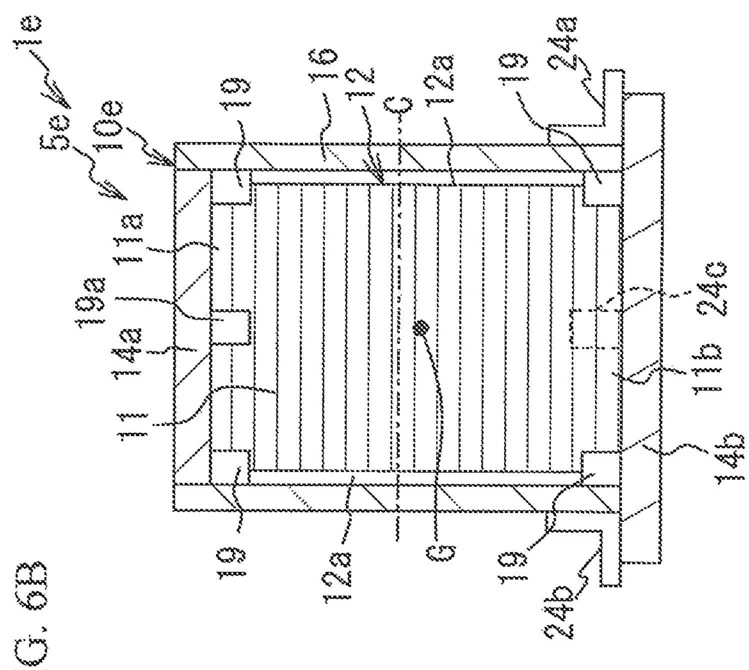
FIG. 6B is a cross-sectional view of a unit according to the fifth variation when viewed from a front side.
Figure 6C:
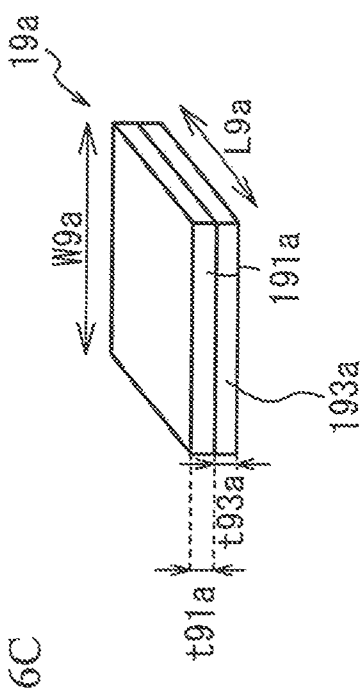
FIG. 6C is a perspective view of a restriction member.
Figure 6A:
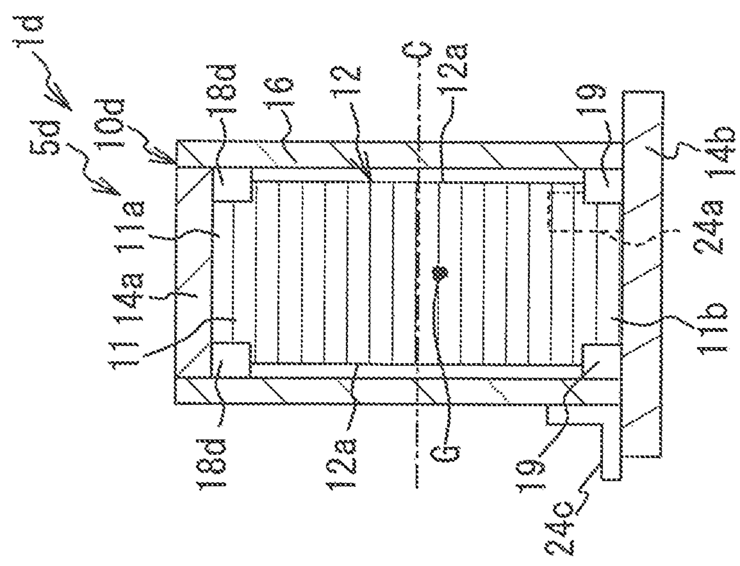
FIG. 6A is a cross-sectional view of a unit according to the fourth variation when viewed from a lateral side.

FIG. 6A is a cross-sectional view of a unit 1*d* according to the fourth variation when viewed from, the lateral side. FIG. 6A corresponds to FIG. 1A. In a stack 10*d* of a module 5*d* of the unit 1*d*, since a hardness of a restriction member 18*d* is higher than that of the restriction member 19 as described above, the restriction force of the restriction member 18*d* arranged in the upper side D1 above the center line C is greater than that of the restriction member 19 arranged in the lower side D2 below the center line C. As a result, the positional displacement of the unit cells 11 can be effectively suppressed. Like the third variation, since the restriction members 18*d* and 19 hold parts where the difference in positional displacement amount tends to be large between the unit cells 11 adjacent to each other, it is possible to effectively suppress the positional displacement of the unit cells 11.

FIG. 6B is a cross-sectional view of a unit 1*e* according to the fifth variation when viewed from the front side. In a stack 10*e* of a module 5*e* of the unit 1*e*, a restriction member 19*a* is formed into a flat plate shape and is arranged not on the corner part of the stacked body 12 but between the flat part of the side surface of the stacked body 12 on the front side and the case 16. In addition, the restriction member 19*a* restricts at least the position of the unit cell 11*a*. Further, each restriction member 19*a* not illustrated is also provided on the outer surface 12*a* of the stacked body 12 on the rear side, the outer surface 12*a* on the left side, and the outer surface 12*a* on the right side. In this manner, the restriction members 19 and 19*a* for restricting the positional displacement of the unit cell 11*a* are arranged at intervals in the peripheral direction of the stacked body 12. Therefore, eight restriction members 19 and 19*a* in total are arranged in the upper side D1 above the center line C, and the number thereof is larger than that of the restriction members 19 arranged in the lower side D2 below the center line C. Therefore, the restriction force of the restriction members 19 and 19*a* arranged in the upper side D1 above the center line C is larger than that of the restriction members 19 arranged in the lower side D2 below the center line C, thereby effectively suppressing the positional displacement of the unit cells 11. FIG. 6C is a perspective view of the restriction member 19*a*. Each of a width W9*a* and a length L9*a* of the restriction member 19*a* is, for example, 30 mm. Further, each of a thickness t91*a* is of a metal portion 191*a* and a thickness t93*a* of an elastic portion 193*a* is, for example, 3 mm.

The restriction member in the above embodiment and variations almost restrict the corner part of the stacked body 12, but is not limited thereto. Like the restriction member 19*a* in the fifth variation described above, the restriction member may restrict only the flat part of the outer surface 12*a* of the stacked body 12.

The restriction members in the above embodiment and variations restrict all the corner parts of the stacked body 12, but are not limited thereto. The restriction member may restrict at least one of the corner parts of the stacked body 12, or at least one of the flat parts of the outer surface 12*a*. For example, in a case where the direction of the inertial force exerting on the module can be estimated beforehand, it is also possible to estimate the direction in which the unit cells tend to positionally displaced due to the inertial force. Thus, the restriction member may be arranged in such a position as to restrict such positional displacement. That is, the direction of the restriction force exerting on the stacked body 12 by the restriction member may be only one direction.

In the above embodiment and variations, the restriction force of the single restriction member arranged in the upper side D1 is equal to or greater than that of the single restriction member arranged in the lower side D2, but is not limited thereto. For example, the restriction force of the single restriction member arranged in the upper side D1 may be smaller than that of the single restriction member arranged in the lower side D2 as long as the number of the restriction members arranged in the upper side D1 is larger than that of the restriction members arranged in the lower side D2, and as long as the restriction force in the upper side D1 of the stacked body 12 is greater than that in the lower side D2. Alternately, the restriction force of the single restriction member arranged in the upper side D1 may be smaller than that of the single restriction member arranged in the lower side D2, as long as the hardness of the restriction member arranged in the upper side D1 is higher than that of the restriction member arranged in the lower side D2, and as long as the restriction force in the upper side D1 of the stacked body 12 is greater than that in the lower side D2.

The restriction member may be embedded in a recess provided on the inner wall surface of the case 16. Further, in the above embodiment and the first to fifth variations, the case 16 having a rectangular tube shape is described as an example of the facing member, but the facing member is not limited thereto. That is, the facing member may be any that faces at least one of the four outer surfaces of the stacked body having a rectangular column shape. For example, the facing member may be a plate-shaped tension plate or the like connecting the end plates 14*a* and 14*b* to each other, ensuring a load on the stacked body 12 in the stacking direction, and facing the outer surface 12*a*. In this case, the restriction member is arranged between the tension plate and the outer surface 12*a*.

Figure 7A:
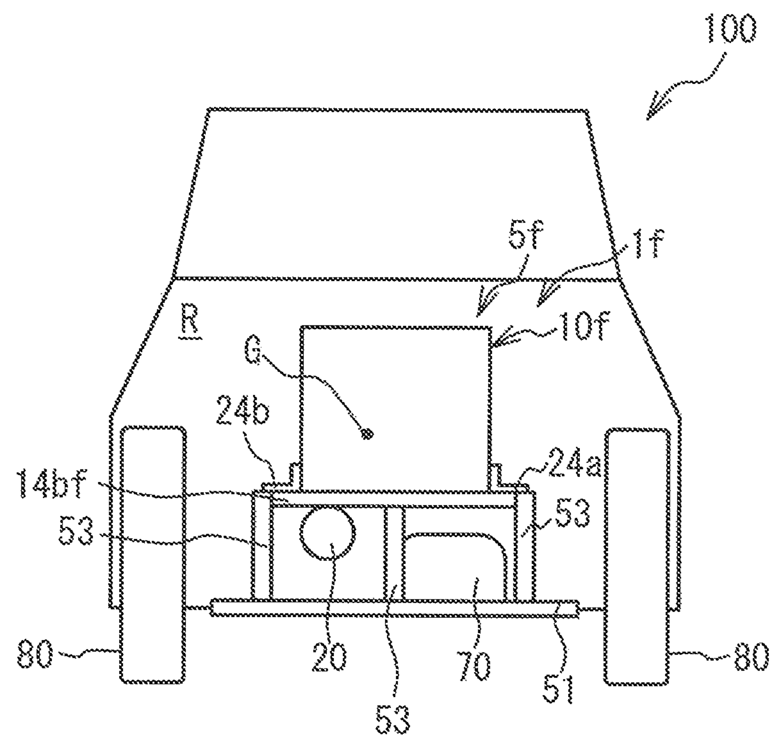
FIG. 7A is a view illustrating the inside of a compartment room when a vehicle is viewed from a front side.
Figure 7B:
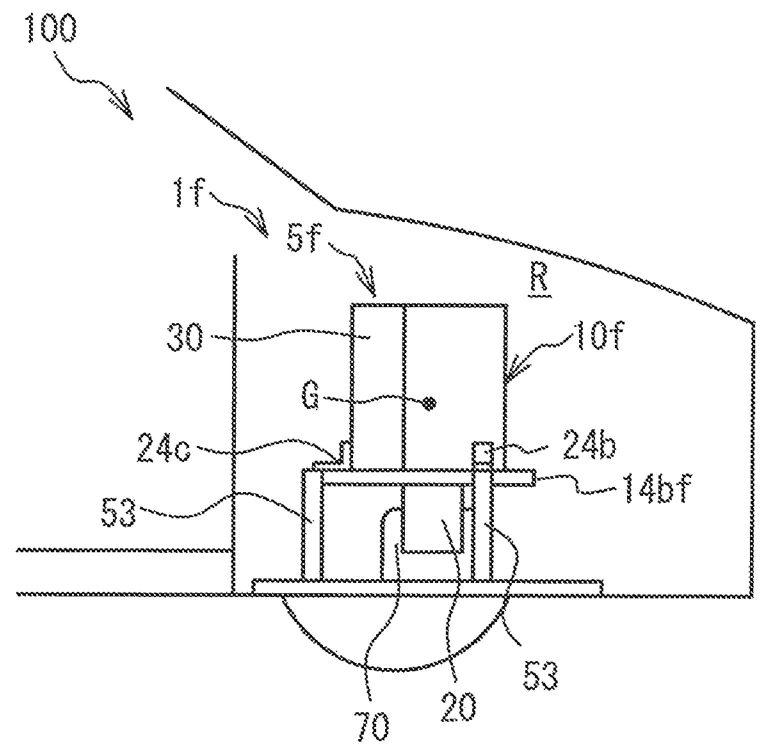
FIG. 7B is a view illustrating the inside of the compartment room when the front side of the vehicle is viewed from a lateral side.

Next, a description will be given of a unit 1*f* according to the sixth variation mounted on a vehicle 100. FIG. 7A is a view illustrating the inside of a compartment room R when the vehicle 100 is viewed from the front side. FIG. 7B is a view illustrating the inside of the compartment room R when the front side of the vehicle 100 is viewed from the lateral side. The unit 1*f* is housed in the compartment room R in the front side of the vehicle 100. A front suspension member 51 is housed in the compartment room R. A motor 70 for driving wheels 80 via a drive shaft not illustrated is supported on the front suspension member 51. Three leg members 53 are fixed on the front suspension member 51, and the brackets 24*a* to 24*c* are fixed to respective tips of the three leg members 53. Since the brackets 24*a* to 24*c* are fixed to an end plate 14*bf* of a stack 10*f*, the stack 10*f* is supported at a predetermined height position from the front suspension member 51. Therefore, the stack 10*f* is supported above the motor 70. A module 5*f* is fixed to the front suspension member 51 as the fixed member via the leg members 53. The front suspension member 51 is also an example of a vehicle body constitution member.

Figure 8:
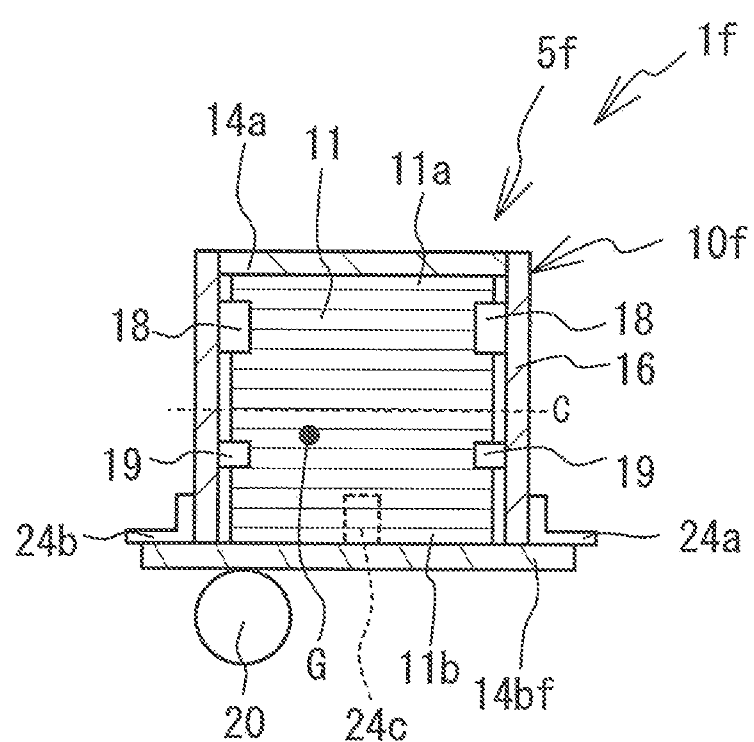
FIG. 8 is a cross-sectional view of a stack of a unit according to the sixth variation when viewed from the front side.

The module 5*f* of the unit 1*f* includes an air compressor 20 and a boost converter 30 that are provided integrally with the stack 10*f*. The air compressor 20 supplies the oxidant gas to be used for electric power generation to the stack 10*f*. The boost converter 30 boosts and supplies the generated electric power of the stack 10*f* to the motor 70 via an inverter not illustrated. The air compressor 20 and the boost converter 30 are examples of auxiliary devices integrally provided in the stack 10*f*. The air compressor 20 is fixed on the lower surface of the end plate 14*bf* between the end plate 14*bf* and the front suspension member 51 by fixing members such as screws. Unlike the above-described end plate 14*b*, the end plate 14*bf* greatly protrudes toward the rear side of the stack 10*f*, and the boost converter 30 is held on the portion, protruding from the stack 10*f*, of the end plate 14*bf* in the rear side of the stack 10*f*. Therefore, the center of gravity G illustrated in FIGS. 7A and 7B is the total center of gravity of the module 5*f* including the stack 10*f*, the air compressor 20, and the boost converter 30. Even in this case, the center of gravity G is positioned in the upper side D1 above the region among the brackets 24*a* to 24*c*. For example, when the vehicle 100 forward collides, the inertial force exerts on the unit 1*f* to rotate about a line connecting the brackets 24*a* and 24*b*. FIG. 8 is a cross-sectional view of the stack 10*f* of the unit 1*f* according to the sixth variation when viewed from the front side. Since the restriction members 18 and 19 are arranged like the above-described embodiment, the positional displacement of the unit cells 11 can be effectively suppressed.

Although the air compressor 20 and the boost converter 30 are illustrated as examples of the auxiliary devices, the auxiliary device is not limited thereto. The auxiliary device may be needed to operate the stack 10*f* or may be supplied with the generated electric power of the stack 10*f*. The device needed to operate the stack 10*f* is, for example, the above-described air compressor 20, a pump circulating the fuel gas or the cooling water to the stack 10*f*, a pipe through which the oxidant gas, the fuel gas or the cooling water flows, and an opening and closing valve provided on such a pipe, an injector for injecting the fuel gas to be supplied to the stack 10*f*, a humidifier humidifying the oxidant gas, a sensor detecting a temperature of the cooling water or a pressure of the fuel gas, and the like. The device supplied with the generated power of the stack 10*f* is, for example, the above-described boost converter 30, an inverter converting the electric power supplied from the stack 10*f* from a direct current to an alternating current, and the like. In the above case, the air compressor 20 and the boost converter 30 are fixed to the end plate 14*bf*, but are not limited thereto, and such an auxiliary device may be fixed to a part other than the end plate 14*bf* of the stack 10*f*. For example, the auxiliary device may be fixed to the upper surface or the side surface of the stack 10*f* apart from the end plate 14*bf*.

In the sixth variation, the module 5*f* is fixed to the front suspension member 51, but is not limited to this. For example, the module 5*f* may be fixed to a front side member arranged in the compartment room R and above the front suspension member 51. The vehicle body constitution member is not limited to the described-above front suspension member 51 and the front side member, and may be any that forms a frame of the vehicle body and can fix the module.

The above embodiment and variations exemplify the brackets 24*a* to 24*c* fixing the end plate 14*b* to the fixed member, but the brackets are not limited thereto. For example, the case 16 or the end plate 14*a* may be fixed to the fixed member. Additionally, in a case where the auxiliary device is integrally provided in the stack, the brackets 24*a* to 24*c* may fix the auxiliary device to the fixed member so as to fix the module thereto.

The above embodiment and variations exemplify the three brackets 24*a* to 24*c* fixing the module, but the module is not limited thereto. For example, the module may be fixed by four or more fixing members or only two fixing members. In either case, when the center of gravity of the module is positioned outside the region between these fixing members, an inertial force exerts on the stack to rotate about the region between the fixing members.

The above embodiment and variations exemplify the module fixed by the brackets 24*a* to 24*c* positioned in the lower side D2 below the center of gravity G, but the module is not limited thereto. For example, the module may be fixed by the brackets 24*a* to 24*c* in the upper side D1 above the center of gravity G. Since the center of gravity G is positioned in the lower side D2 of the stacking direction LD below the region among the brackets 24*a* to 24*c* in this case, the first side of the stacking direction LD is the lower side D2 and the lower side in the gravity direction, and the second side of the stacking direction LD is the upper side D1 of the gravity direction. The above embodiments and variations exemplify the case where the stacking direction of the stacked body is substantially the same as the gravity direction, but the stacking direction is not limited thereto. For example, the stacking direction may intersect with the gravity direction, or may be the horizontal direction perpendicular to the gravity direction.

Although some embodiments of the present disclosure have been described in detail, the present disclosure is not limited to the specific embodiments but may be varied or changed within the scope of the present disclosure as claimed.

What is claimed is:

1. A fuel cell unit comprising:
a fuel cell module including
  a fuel cell stack including:
    a stacked body in which unit cells are stacked;
    a pair of end plates sandwiching the stacked body in a stacking direction;
    a facing member facing an outer surface of the stacked body extending along the stacking direction; and
    first and second restriction members arranged between the facing member and the stacked body, and restricting a position of the stacked body in a direction perpendicular to the stacking direction by contacting with the outer surface; and
fixing members fixing the fuel cell module to a fixed member,
wherein
the stacking direction includes a first direction and a second direction opposite to the first direction, a center of gravity of the fuel cell module is positioned in the first direction of the stacking direction from a region surrounded by the fixing members, the first restriction member restricts a first part of the stacked body positioned in the first direction of the stacking direction from a center of the stacked body, the second restriction member restricts a second part of the stacked body positioned in the second direction of the stacking direction from the center of the stacked body, and the first and second restriction members are provided such that restriction force restricting the first part of the stacked body is greater than restriction force restricting the second part of the stacked body.

2. The fuel cell unit of claim 1, wherein the fuel cell module includes an auxiliary device integrally provided in the fuel cell stack.

3. The fuel cell unit of claim 1, wherein a size of the first restriction member is greater than a size of the second restriction member.

4. The fuel cell unit of claim 1, wherein a hardness of the first restriction member is greater than a hardness of the second restriction member.

5. The fuel cell unit of claim 1, wherein at least the first restriction member includes first restriction members, and the number of the first restriction members is larger than the number of the second restriction member.

6. The fuel cell unit of claim 1, wherein the first restriction member is positioned at one end of the stacked body positioned in the first direction of the stacking direction from the center of the stacked body, and the second restriction member is positioned at another end of the stacked body positioned in the second direction of the stacking direction from the center of the stacked body.

7. A fuel cell vehicle comprising:

a vehicle body constitution member; and a fuel cell unit, wherein the fuel cell unit includes:

a fuel cell module including a fuel cell stack including:

a stacked body in which unit cells are stacked;

a pair of end plates sandwiching the stacked body in a stacking direction;

a facing member facing an outer surface of the stacked body extending along the stacking direction; and first and second restriction members arranged between the facing member and the stacked body, and restricting a position of the stacked body in a direction perpendicular to the stacking direction by contacting with the outer surface; and fixing members fixing the fuel cell module to a fixed member, the stacking direction includes a first direction and a second direction opposite to the first direction, a center of gravity of the fuel cell module is positioned in the first direction of the stacking direction from a region surrounded by the fixing members, the first restriction member restricts a first part of the stacked body positioned in the first direction of the stacking direction from a center of the stacked body, the second restriction member restricts a second part of the stacked body positioned in the second direction of the stacking direction from the center of the stacked body, the first and second restriction members are provided such that restriction force restricting the first part of the stacked body is greater than restriction force restricting the second part of the stacked body, and the fixed member is the vehicle body constitution member.

8. The fuel cell vehicle of claim 7, wherein the fuel cell module includes an auxiliary device integrally provided in the fuel cell stack.

9. The fuel cell vehicle of claim 7, wherein a size of the first restriction member is greater than a size of the second restriction member.

10. The fuel cell vehicle of claim 7, wherein a hardness of the first restriction member is greater than a hardness of the second restriction member.

11. The fuel cell vehicle of claim 7, wherein at least the first restriction member includes first restriction members, and the number of the first restriction members is larger than the number of the second restriction member.

12. The fuel cell vehicle of claim 7, wherein the first restriction member is positioned at one end of the stacked body positioned in the first direction of the stacking direction from the center of the stacked body, and the second restriction member is positioned at another end of the stacked body positioned in the second direction of the stacking direction from the center of the stacked body.

* * * * *

UNITED STATES PATENT AND TRADEMARK OFFICE

CERTIFICATE OF CORRECTION

PATENT NO. : 10,818,955 B2
APPLICATION NO. : 16/178953
DATED : October 27, 2020
INVENTOR(S) : Tomoaki Uchiyama and Masayuki Ito It is certified that error appears in the above-identified patent and that said Letters Patent is hereby corrected as shown below:

In the Specification

In Column 2, Line(s) 47, after “surface”, insert --;--.

In Column 8, Line(s) 24, after “side”, delete “,” and insert --.--, therefor.

In Column 9, Line(s) 26, after “from”, delete “,”.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*